United States Patent

[11] 3,593,156

[72] Inventor Harley D. Jordan
South Daytona, Fla.
[21] Appl. No. 788,145
[22] Filed Dec. 31, 1968
[45] Patented July 13, 1971
[73] Assignee General Electric Company

[54] FREQUENCY DOUBLER
5 Claims, 2 Drawing Figs.

[52] U.S. Cl. .................... 328/20, 328/26, 328/28, 330/30
[51] Int. Cl. .................... H03k 5/153
[50] Field of Search .................... 328/20, 26, 28; 307/220; 330/300

[56] References Cited

UNITED STATES PATENTS

| | | | |
|---|---|---|---|
| 2,267,120 | 12/1941 | Mathes | 328/26 X |
| 3,261,991 | 7/1966 | Lash | 328/20 X |
| 3,443,126 | 5/1969 | Meyer | 328/26 X |
| 3,448,387 | 6/1969 | Brandt et al | 328/20 |
| 3,502,905 | 3/1970 | Bicking | 330/30 X |
| 3,502,911 | 3/1970 | Lehman | 330/30 X |

*Primary Examiner*—John S. Heyman
*Attorneys*—Raymond H. Quist, Allen Amgott, Henry W. Kaufmann, Melvin M. Goldenberg, Frank L. Neuhauser and Oscar B. Waddell

ABSTRACT: A circuit for doubling the frequency of an alternating signal. The signal is rectified into positive and negative components. Each component is then shifted from the zero reference by blocking capacitors so that it has equal areas under the positive and negative half-cycle waveforms. The signals are compared in a difference amplifier which produces a positive or negative output depending on which input is more positive. In one cycle of the input signal four such changes occur, producing a square wave output of double the input frequency.

INVENTOR.
Harley D. Jordan
BY R H Quist
ATTORNEY.

FREQUENCY DOUBLER

BACKGROUND OF THE INVENTION

This invention relates to a circuit for producing an output signal having a frequency double that of an applied alternating signal Although frequency changing devices of various types including motor-generator sets and multivibrators have previously been disclosed, there are a number of applications where frequency doubling can be employed and a simple, economical circuit is desired. For example, if the second harmonic of a frequency contains information which is to be extracted, a frequency doubler can provide the necessary timing signals.

SUMMARY OF THE INVENTION

This invention involves rectifying an alternating signal into its positive and negative components, shifting each of these components relative to its zero voltage level to produce positive and negative voltage half-cycles, and then applying the developed signals to a difference amplifier. The difference amplifier produces a positive output when the signal at one input terminal is more positive than at the other, and a negative output when the signal at the other terminal is more positive than that at the one terminal. Four times in each cycle of the alternating signal, the output changes between positive and negative.

DESCRIPTION OF THE PREFERRED EMBODIMENT

Figure 1:
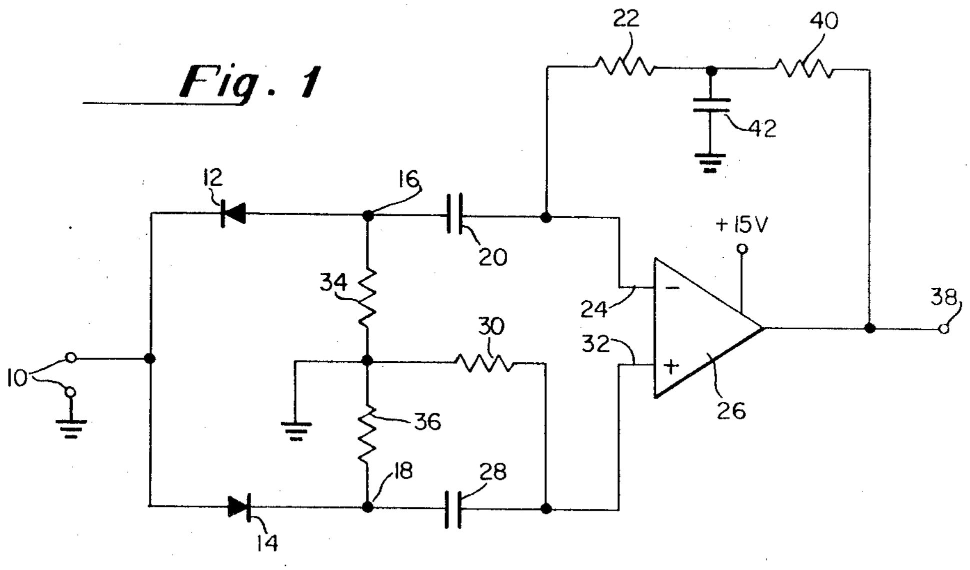
FIG. 1 is a schematic circuit diagram of one embodiment of the invention.

Referring to FIG. 1, a sinusoidal signal is applied to terminals 10. Diodes 12 and 14 rectify the signal providing, at junctions 16 and 18, the signals illustrated in FIG. 2. Blocking capacitor 20 together with resistor 22 produce a shift in direct current voltage level so that the upper and lower half-cycles have a zero average. The input to pin 24 of difference amplifier 26 has the form shown in FIG. 2. In a similar manner, blocking capacitor 28 and resistor 30 establish the illustrated input to pin 32. Resistors 34 and 36 permit the discharge of capacitors 20 and 28.

Figure 2:
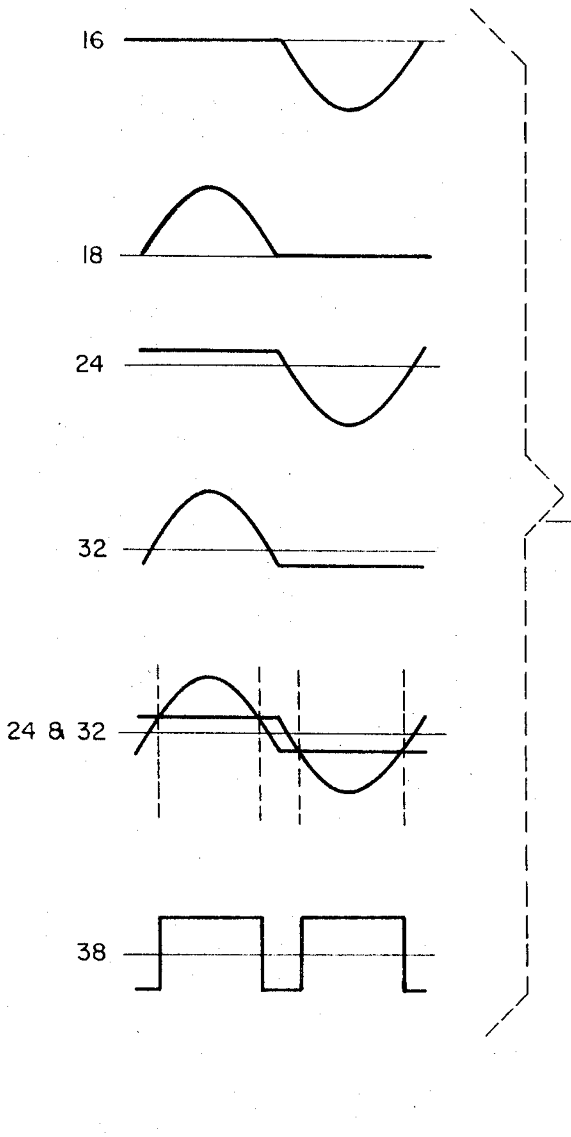
FIG. 2 illustrates the waveforms of signals at various locations in the circuit of FIG. 1.

Difference amplifier 26 compares the two inputs and when the input at pin 24 is the greatest (most positive) produces a negative output at output terminal 38. When the input at pin 32 is the greatest, a positive output is produced. As shown in FIG. 2, when the inputs of pins 24 and 32 are superimposed, at four times in each cycle there is a change in the output as a result of the maximum input voltage changing between pins 24 and 32. The output 38 is therefore changing at double the frequency of the signal applied at input terminals 10.

It will be observed that output 38 is not symmetrical; i.e., the positive-going portions have a longer duration than the negative. A feedback loop comprising resistors 40 and 22, and capacitor 42 applies a DC voltage to pin 24 sufficient to maintain a zero average as the actual output at terminal 38. For example, with the output signal at terminal 38 as shown in FIG. 2, capacitor 42 assumes a positive voltage. This causes a shift in the positive direction of the input signal at pin 24. Examination of the superimposed signals 24 and 26 shows that this will have the result of reducing the duration of the positive-going output signals. In cases where symmetry is not necessary, the feedback may be eliminated.

Although the invention has been described with respect to a sinusoidal input signal, it works also with a triangular input signal and with other alternating signal forms provided that when the rectified signals are superimposed, transitions such as those shown in FIG. 2 occur.

The description and illustration of a particular embodiment of a frequency doubler is exemplary and not intended to restrict or limit the scope of the invention to this embodiment.

I claim:

1. A frequency-doubling circuit comprising:
means for rectifying an alternating signal into positive and negative signals;
means for shifting each of said rectified signals relative to its zero voltage level to produce positive and negative voltage half-cycles;
a difference amplifier having two input terminals and an output terminal;
said difference amplifier producing a positive output when the voltage at one input is more positive than that at the other input, and producing a negative output when the voltage at the other input is more positive than that at the one input; and
said rectified and shifted signals being applied to the input terminals of said difference amplifier, whereby a square wave output of double the original alternating frequency is produced.

2. A frequency-doubling circuit in accordance with claim 1 further comprising:
a feedback network between the output terminal of said difference amplifier and one of its input terminals; and
said feedback network comprising first (40) and second (22) resistors connected in series and a capacitor connected between them and to ground.

3. A frequency-doubling circuit in accordance with claim 2 wherein said means for rectifying said alternating signal comprises:
a pair of oppositely poled diodes (12 and 14).

4. A frequency-doubling circuit in accordance with claim 3 wherein said means for shifting each of said rectified signals comprises:
a pair of blocking capacitors (12 and 14) each having one terminal connected to one of said pair of diodes;
a resistor (30) having one terminal connected to the other terminal of one of said pair of blocking capacitors (28) and its other terminal connected to ground; and
a resistor (22) having one terminal connected to the other of said blocking capacitors,
said resistor also constituting part of said feedback circuit.

5. A frequency-doubling circuit comprising:
input terminals for receiving an alternating signal;
a pair of oppositely poled diodes each having one terminal connected to said input terminals;
a pair of blocking capacitors having one terminal connected to the other terminals of said diodes;
two series-connected resistors having a first ground connection between them, connected across the other terminals of said diodes;
a difference amplifier having its two input terminals connected to the other terminals of said capacitors;
a resistor connected between said first ground connection and the other terminal of one of said capacitors;
a second pair of series-connected resistors connected between the output of said difference amplifier and the other terminal of the other of said capacitors; and
a capacitor having one terminal connected to the junction of said second pair of resistors, and the other terminal connected to ground.
a pair of blocking capacitors having one terminal connected to the other terminals of said diodes;
two series-connected resistors having a first ground connection between them, connected across the other terminals of said diodes;
a difference amplifier having its two input terminals connected to the other terminals of said capacitors;
a resistor connected between said first ground connection and the other terminal of one of said capacitors;
a second pair of series connected resistors connected between the output of said difference amplifier and the other terminal of the other of said capacitors; and
a capacitor having one terminal connected to the junction of said second pair of resistors, and the other terminal connected to ground.